(12) United States Patent
Bruck et al.

(10) Patent No.: US 8,096,618 B2
(45) Date of Patent: *Jan. 17, 2012

(54) SEAT RECLINER/DUMP MECHANISM SUCH AS INCORPORATED INTO A SEATBACK SLAVED TO A FLOOR LATCH RELEASE

(75) Inventors: Stephen C. Bruck, Howell, MI (US); David M. Grable, Clinton Township, MI (US)

(73) Assignee: BAE Industries, Inc., Warren, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/974,485

(22) Filed: Dec. 21, 2010

(65) Prior Publication Data

US 2011/0084533 A1    Apr. 14, 2011

Related U.S. Application Data

(62) Division of application No. 12/184,588, filed on Aug. 1, 2008, now Pat. No. 7,871,127.

(51) Int. Cl.
*B60N 2/02* (2006.01)
(52) U.S. Cl. ............ 297/378.11; 297/378.1; 297/378.13
(58) Field of Classification Search ............... 297/378.1, 297/378.11, 378.12, 378.13
See application file for complete search history.

(56) References Cited

U.S. PATENT DOCUMENTS

| | | | |
|---|---|---|---|
| 3,954,245 A | 5/1976 | Costin | |
| 4,223,946 A | 9/1980 | Kluting et al. | |
| 4,372,610 A | 2/1983 | Fisher, III et al. | |
| 4,484,776 A | 11/1984 | Gokimoto et al. | |
| 4,484,779 A | 11/1984 | Suzuki | |
| 4,634,182 A | 1/1987 | Tanaka | |
| 4,705,319 A | 11/1987 | Bell | |
| 4,747,641 A | 5/1988 | Bell | |
| 5,393,116 A | 2/1995 | Bolsworth et al. | |
| 5,522,643 A * | 6/1996 | Matsuura | 297/367 R |

(Continued)

FOREIGN PATENT DOCUMENTS

JP    59-034942 A    2/1984

*Primary Examiner* — David Dunn
*Assistant Examiner* — Erika Garrett
(74) *Attorney, Agent, or Firm* — Gifford, Krass, Sprinkle, Anderson & Citkowski, P.C.

(57) ABSTRACT

A recliner mechanism for use with a vehicle seat having a floor striker engaging bottom and a pivotally associated seatback. A seatback is pivotally secured to a fixed support and includes an arcuate lower surface upon which are defined teeth. A pawl is pivotally secured to the support and includes an upper surface with additional inter-engaging teeth when the seatback is in an upright position. A release cam secures to the support proximate a recessed underside location of the pawl and maintains the pawl in locking engagement with the seatback sector in a first position. The release cam rotates to cause the pawl to pivot out of engagement with the seatback, allowing it to pivot to a dump position opposing the seat bottom and concurrent with the seat bottom releasing from the floor striker and tumbling to a forward rotated position. A floor latch release lever is also pivotally secured to the support and, upon being contacted by the release cam, in turn pivots so that an end feature displaces to prevent the locking pawl from pivoting in a reverse direction against the seatback. The release lever reverse pivots in response to the seat bottom reengaging the floor striker, causing the pawl to reverse pivot its teeth into reengagement with the seatback upon the latter rotating back to the upright position.

7 Claims, 9 Drawing Sheets

U.S. PATENT DOCUMENTS

| | | | |
|---|---|---|---|
| 5,527,087 A | 6/1996 | Takeda et al. | |
| 5,542,745 A | 8/1996 | Takeda et al. | |
| 5,577,805 A | 11/1996 | Glinter et al. | |
| 5,702,145 A | 12/1997 | Fowler et al. | |
| 6,139,104 A | 10/2000 | Brewer | |
| 6,209,955 B1 | 4/2001 | Seibold | |
| 6,290,297 B1 | 9/2001 | Yu | |
| 6,345,867 B1 | 2/2002 | Hellrung et al. | |
| 6,478,358 B1 | 11/2002 | Okazaki et al. | |
| 6,481,799 B1* | 11/2002 | Whalen | 297/378.11 |
| 6,502,903 B2* | 1/2003 | Bruck et al. | 297/378.11 |
| 6,601,921 B1* | 8/2003 | Collins | 297/378.12 |
| 6,698,837 B2 | 3/2004 | Pejathaya et al. | |
| 6,805,410 B2 | 10/2004 | Christoffel et al. | |
| 6,893,093 B2 | 5/2005 | Nock et al. | |
| 6,910,739 B2* | 6/2005 | Grable et al. | 297/378.12 |
| 7,011,370 B2 | 3/2006 | Jeong et al. | |
| 7,017,995 B2 | 3/2006 | De Nichilo et al. | |
| 7,044,552 B2 | 5/2006 | Muller et al. | |
| 7,086,697 B2* | 8/2006 | Tame | 297/367 R |
| 7,114,779 B2* | 10/2006 | Thiel et al. | 297/378.12 |
| 7,152,922 B2 | 12/2006 | Garland | |
| 7,172,253 B2 | 2/2007 | Haverkamp | |
| 7,222,907 B2 | 5/2007 | Lutzka et al. | |
| 7,237,839 B2 | 7/2007 | Aufrere et al. | |
| 7,287,814 B2* | 10/2007 | Heimann et al. | 297/367 R |
| 7,306,286 B2 | 12/2007 | Syrowik et al. | |
| 7,320,501 B2* | 1/2008 | Keyser et al. | 297/378.12 |
| 7,367,624 B2* | 5/2008 | Garland | 297/362.11 |
| 7,871,127 B2* | 1/2011 | Bruck et al. | 297/378.11 |
| 2007/0090674 A1 | 4/2007 | Miyauchi et al. | |

* cited by examiner

SEAT RECLINER/DUMP MECHANISM SUCH AS INCORPORATED INTO A SEATBACK SLAVED TO A FLOOR LATCH RELEASE

CROSS-REFERENCE TO RELATED APPLICATIONS

This Application is a Division of application Ser. No. 12/184,588 filed on Aug. 1, 2008.

FIELD OF THE INVENTION

The present invention relates generally to a seatback recliner/dump mechanism incorporated into a seat assembly. More specifically, the present invention discloses a seat assembly in which a cam and pawl arrangement trigger rotation of a pivotally secured seatback to a dump position. A floor latch release is cooperatively actuated by the cam, during release of the pawl from the seatback, and rotates to a position which prevents re-latching of the pawl with the seatback in the upright rotated position, and until a separate floor latch assembly is engaged with a rear mounted striker.

BACKGROUND OF THE INVENTION

The prior art is documented with examples of seat recliner mechanisms, and such as which are slaved to a floor latch release in order to prevent inadvertent latching of an upright adjusted seatback, and until such time as the floor latch release is re-engaged to an associated striker. An example of this is set forth in U.S. Pat. No. 6,910,739, issued to Grable, and which teaches a release mechanism operably engaged to the seat back and including an actuating handle extending from the seat bottom further configured by outer and inner plates sandwiching therebetween the seat back and the release mechanism. U.S. Pat. No. 7,222,907, issued to Lutzka, further teaches a floor release latch mechanism for a vehicle seat, and which is an example of a rear striker engaging latch mechanism associated with a rotating (dump and tumble) rear row vehicle seat.

SUMMARY OF THE INVENTION

The present invention discloses a recliner mechanism for use with a vehicle seat having a floor striker engaging bottom and a pivotally associated seatback. A seatback affixed sector is pivotally secured to a fixed support, such as between a pair of floor affixed and upwardly extending support plates, and includes an arcuate lower surface upon which are defined teeth. A pawl is pivotally secured to the support and includes an upper surface with additional inter-engaging teeth when the seatback is in an upright position.

A release cam secures to the support proximate a recessed underside location of the pawl and maintains the pawl in locking engagement with the seatback sector in a first position. The release cam rotates to cause the pawl to pivot out of engagement with the seatback, allowing it to pivot to a dump position opposing the seat bottom and concurrent with the seat bottom releasing from the floor striker and tumbling to a forward rotated position. A floor latch release lever is also pivotally secured to the support and, upon being contacted by the release cam, in turn pivots so that an end feature displaces to prevent the locking pawl from pivoting in a reverse direction against the seatback. The release lever reverse pivots in response to the seat bottom reengaging the floor striker, causing the pawl to reverse pivot its teeth into reengagement with the seatback upon the latter rotating back to the upright position.

Additional features include a detent cam pivotally secured to the support and, in response to actuation of the release cam and pivoting of the seatback to the dump position, is likewise pivoted so that a shoulder defined location in the detent cam engages a stepped location formed upon the forwardly rotated seatback sector. Springs are secured to the support plate exteriors and bias the seatback sector (in the forward dump direction), as well as the release cam (in a locking direction against the pawl).

In addition to a first handle secured to a plate exterior and rotatably slaving the release cam, a second lower end spline supported handle is pivotally engaged by the first handle, via an extending linkage. A linearly displaceable cable extends from a location of the first handle to a remote floor latch mechanism secured to the seat bottom engageable with the floor striker.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
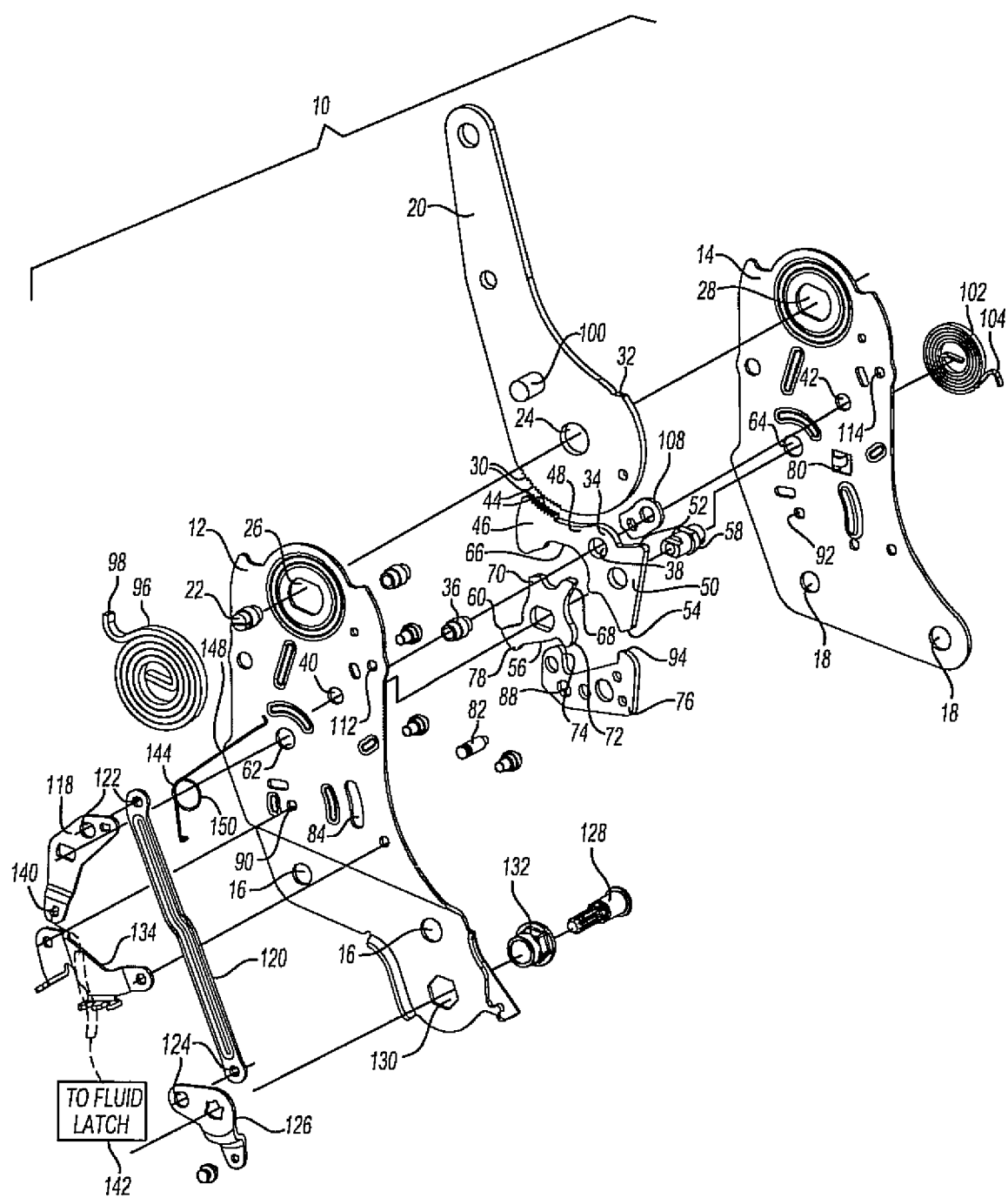
FIG. 1 is an exploded view of the seat recliner mechanism according an embodiment of the present inventions.

Referring now to FIGS. 1-6, a series of exploded, plan and perspective views are each generally shown at 10 of a recliner mechanism for use with a vehicle seat. The recliner mechanism illustrated relocates all coacting components, e.g. including pawl, release cam, floor latch release lever and detent cam, between fixed supports, thereby promoting more dependable operation and limiting undesirable lateral misalignment of the coacting components, and in addition to avoiding the problem of externally supported components becoming bent or otherwise misaligned, such as during shipping.

As previously described, the recliner mechanism 10 is utilized in one-non-limiting application in combination with a vehicle (typically non-first row) seat having a floor striker engaging bottom and a pivotally associated seatback. Reference is made to U.S. Pat. No. 7,222,907, to Lutzka et al., and which discloses one variation of a floor latch mechanism which can be incorporated into a seat bottom for engaging a floor mounted striker, which is described as being one potential application with which the recliner mechanism 10 cooperates. In this fashion, the seat bottom is capable of tumbling to a forward position, typically following forward dump of the seat back in opposing fashion against the bottom, this allowing access to an area behind the seat, such as for storage or ingress/egress of occupants seated in a further row behind the dump and tumble seat.

A pair of fixed support plates 12 and 14 are secured in closely spaced apart and upwardly extending fashion to a floor location (not shown) associated with a vehicle seat (see pairs of floor mounting apertures 16 and 18 associated with each of the support plates 12 and 14, respectively) and define a package containing structure within which the various coacting components, to be discussed as follows, are sandwiched. While one preferred embodiment discloses employing a pair of sandwiching support plates, it is also envisioned that a single support surface can be employed within the scope of the invention. Further, and although limited to a description of a given recliner mechanism, it is understood that either a single or pair of recliner mechanisms can be employed, at either or both inboard or outboard locations of a seat assembly mounted within a seating compartment.

The fixed support plates 12 and 14, as with each of the subsequently described components, are constructed of a durable material, such as a various grade steel, and each further exhibits (as best shown in the exploded view of FIG. 1) a generally planar shaped configuration, this permitting the assembly therebetween of the various components associated with the recliner mechanism 10, as well as the location of various (apertured) mounting locations for securing the various components at selected pivotal/rotatable locations.

A seatback affixing sector is shown at 20 and is pivotally secured by main pivot 22 (FIG. 1) inserting through an aperture 24 located centrally within a generally lower and rounded portion of the sector 20. Additional aligning apertures 26 and 28 (FIG. 1) are defined at corresponding upper end locations of the support plates 12 and 14 and define a pivotal mounting relationship between the seatback sector 20 and the sandwiching support plates.

The sector 20 further exhibits an arcuate lower surface, along a portion of which are defined a first plurality of teeth 30. Also illustrated at 32 is a shoulder defined location, this positioned along a front edge of the sector 20 between the lower arcuate extending surface and upper extending body. As will be subsequently discussed, the shoulder 32 assists in retaining the seatback sector 20 in a forward dump position (see FIG. 6).

A pawl 34 is pivotally secured, via pin 36 seating through pawl aperture 38 and aligning support plate apertures 40 and 42, established between the supports. The pawl 34 exhibits a second plurality of teeth 44, these being defined along an upper surface of a head projecting portion 46 extending from the intermediately positioned mounting location via an interconnecting neck 48 and in a direction generally opposite a triangular shaped portion 50. The triangular shaped portion 50 further includes an upper surface 52 and a lower to end projecting surface 54.

A release cam 56 is secured via pin 58 inserting through cam aperture 60 and aligning support plate apertures 62 and 64, between the supports 12 and 14, and proximate a recessed underside location 66 of the pawl 34. The release cam 56 further includes first 68 and second 70 projections engageable, depending upon a rotational direction of the release cam 60, with locations associated with the recessed underside 66 of the pawl 34. A third projection is also shown at 72 (as best shown in FIG. 1) and engages an associated feature 74 of a pivotally secured release lever 76.

Figure 2:
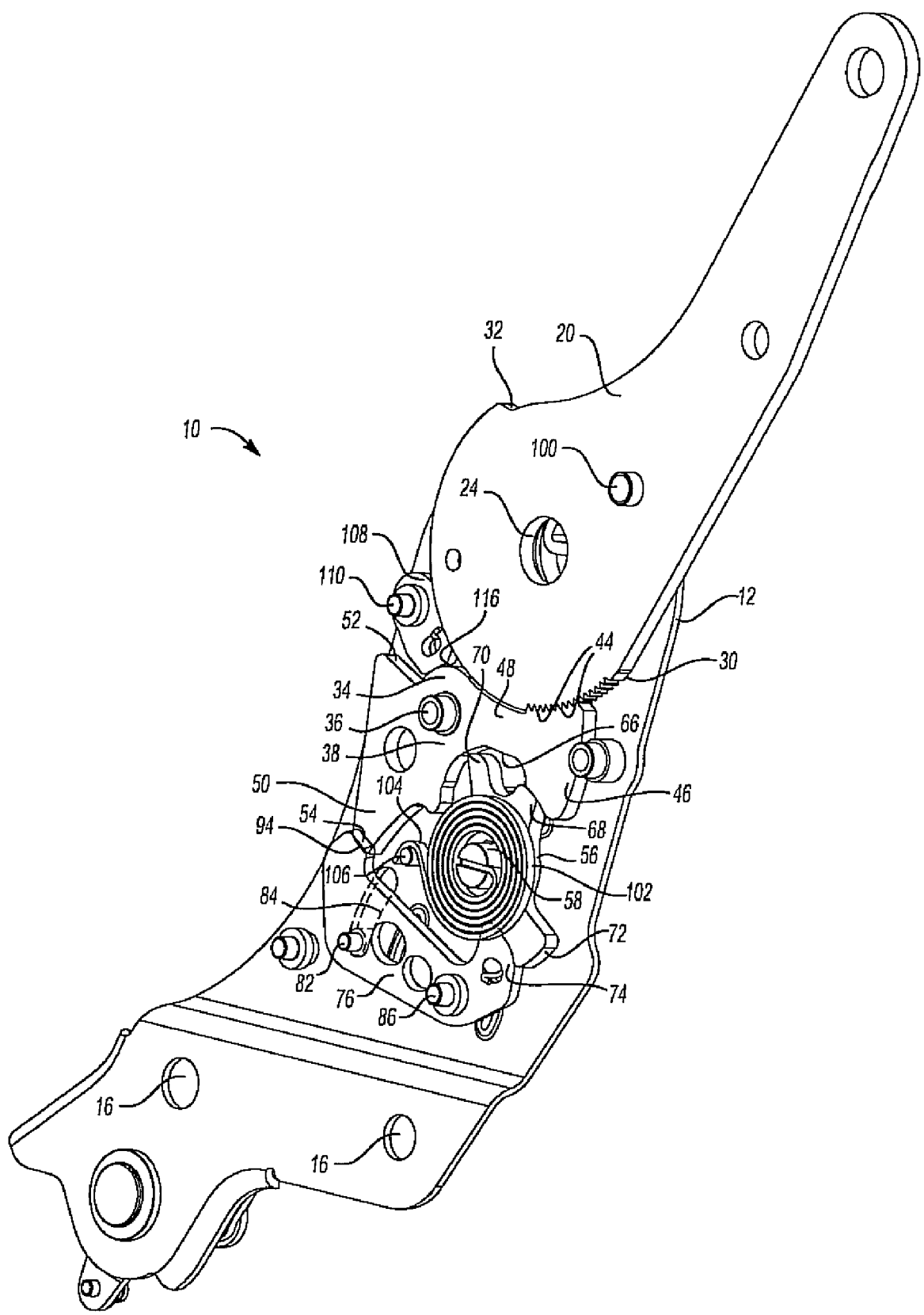
FIG. 2 is a rotated and assembled perspective of the seat recliner mechanism shown in FIG. 1, and with the outer support plate removed.
Figure 5:
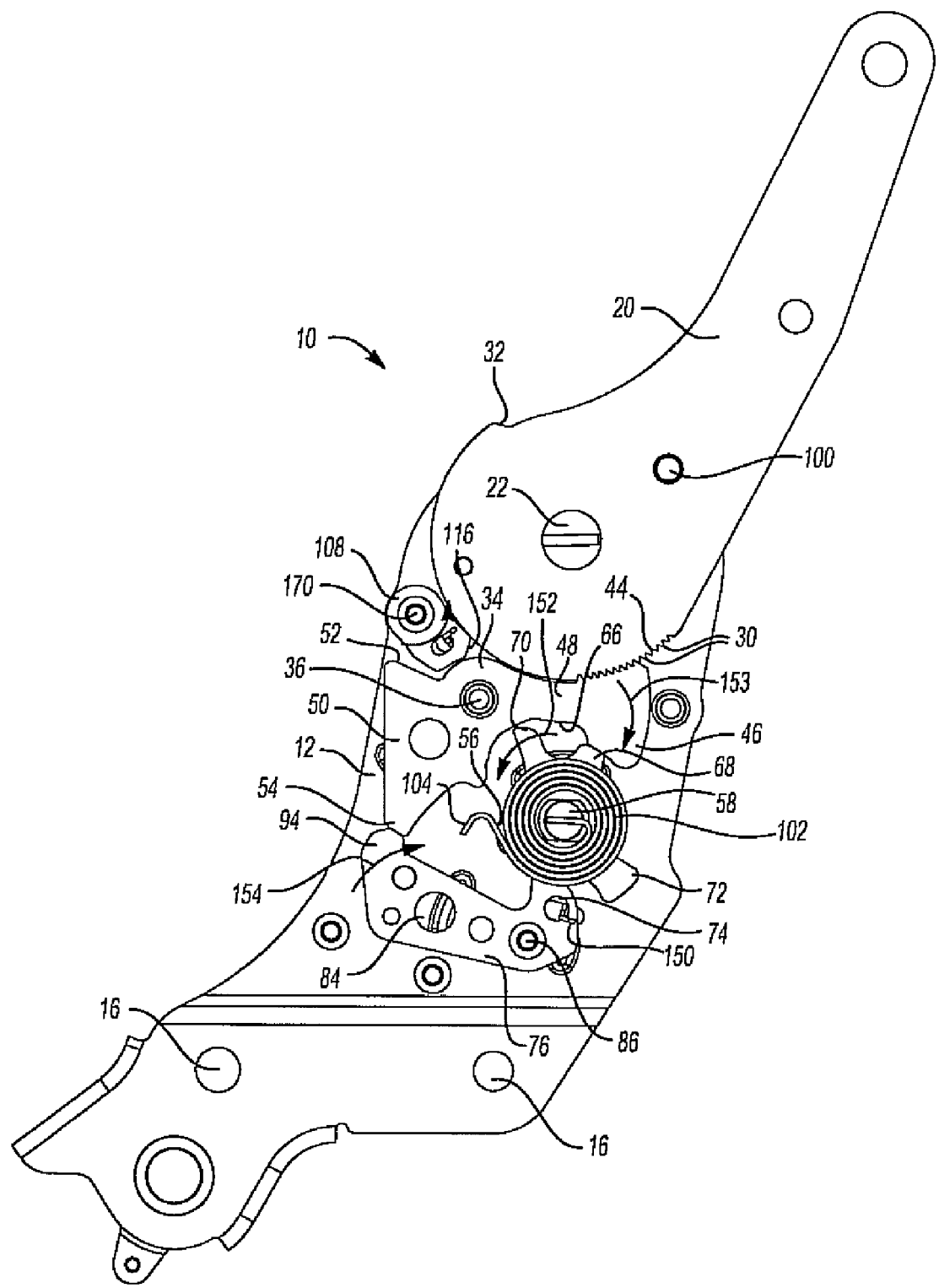
FIG. 5 is a plan view of the mechanism as presented in FIG. 2 and further illustrating the arrangement of the cam and slaved rotatable locking pawl in teethed engagement with the seatback sector.

A fourth projection 78 (see FIG. 1) of the release cam 56 and can contact a stop rivet or other location 80 see secured to the support plate 14, this concurrent with the first projection 68 biasing the pawl 34 in a locking direction against the seatback sector 20 (see as best shown in FIGS. 2 and 5. A pin 82 extends from the release lever 76 and seats within an arcuate slot 84 defined in the support plate 12 to define a pivotal range of motion of the release lever 76. Pivotal mounting pin 86 extends through a selected pivotal mounting aperture 88 in the release lever 76, as well as aligning apertures 90 and 92 in the support plates 12 and 14 (see again FIG. 1). Release lever 76 further includes an additional end defined feature 94, this extending in a generally opposite direction with respect to release lever defined feature 74.

A first clock spring 96 is secured to an external surface of support plate 12, in coaxial fashion over aperture 26 by inserting main pivot pin 22, and includes a curled end 98 which engages a pin 100 extending from the seatback sector 20 in order to bias the seatback in a forward dump direction. A second spring 102 likewise includes a curled end 104 which engages a support plate 12 mounted pin 106 (see FIG. 2) in order to mount against the support plate 12, in coaxial fashion over the cam 56 and associated pin 58, and to bias the release cam 56 in a direction to abut the pawl 34 against the seatback sector 20 (again FIGS. 2 and 5).

A detent cam 108 is pivotally secured by pin 110 extending through an aperture in the cam 108 as well as aligning apertures 112 and 114 in the support plates 12 and 14. The detent cam 108 exhibits a shoulder defined location 116 and which, as will be further described, cooperatively pivots with actuation of the mechanism and forward dump of the seatback sector 20, in order to come into an abutting engagement with the stepped location 32 of the seatback sector 20.

Figure 3:
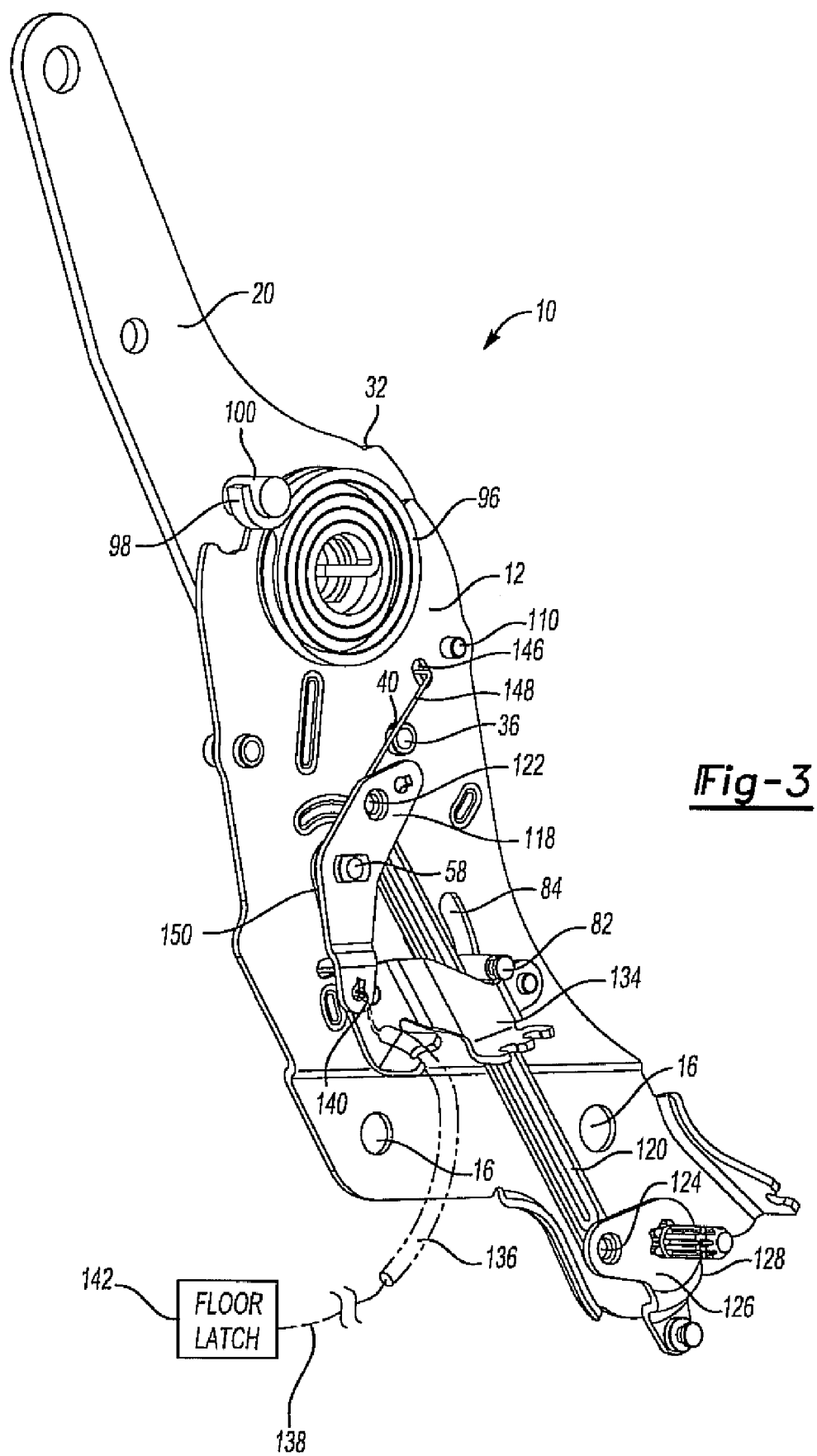
FIG. 3 is a further rotated and reverse side perspective of the mechanism shown in FIG. 2 and illustrating the linkage interconnected handle and lever.
Figure 4:
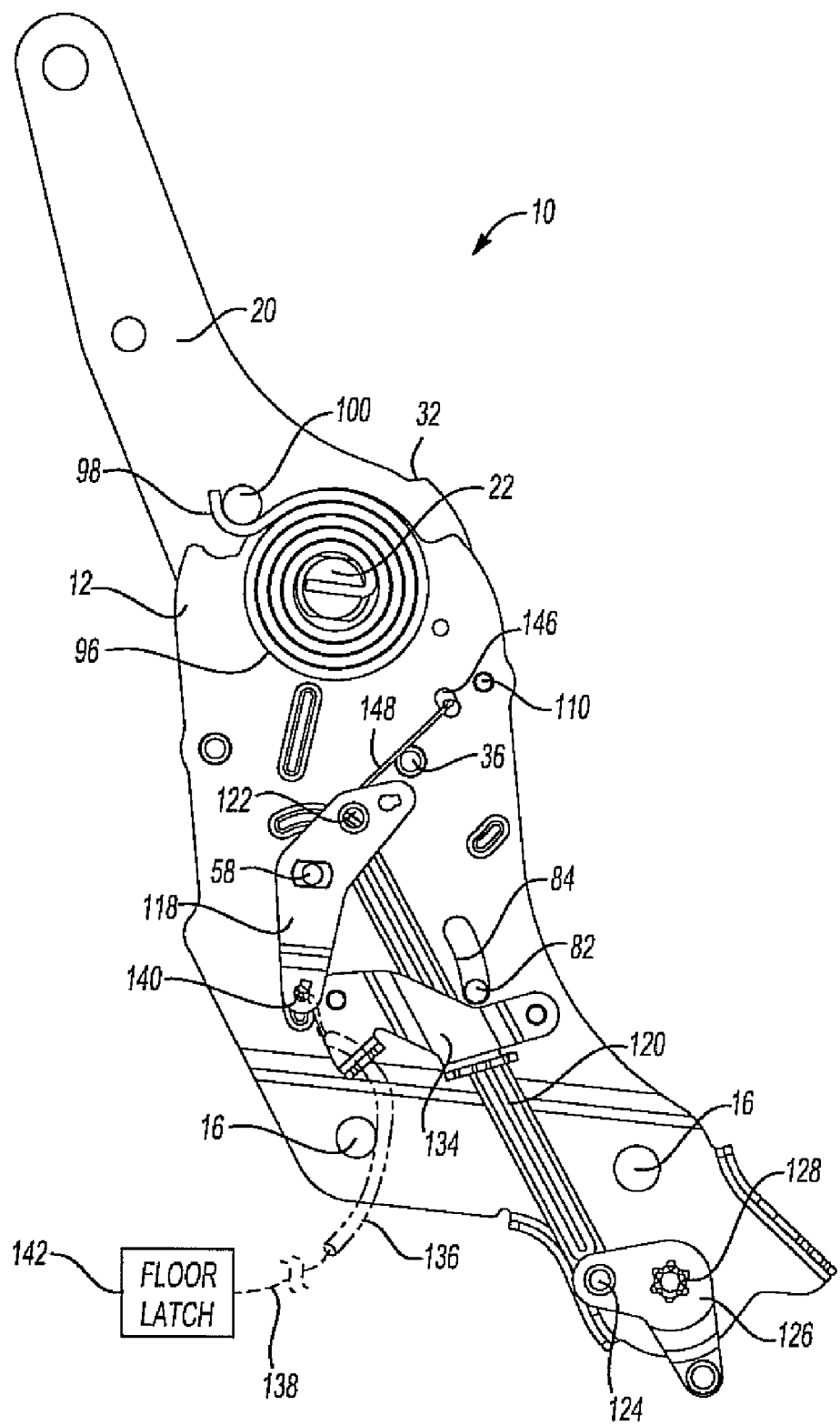
FIG. 4 is a plan view of the mechanism as presented in FIG. 3 and showing the seatback in an upright design position.

Referring again to FIG. 1, in combination with FIGS. 2 and 3, additional features associated with the recliner mechanism 10 include a first handle 118 secured to an exterior location of support plate 12, and opposite the mounting location of second spring 102, and by which the release cam 56 is slaved to the first handle 118. An elongated linkage 120 is connected at a first upper end 122 (see also aligning apertures between linkage 120 and first handle 118 collectively referenced in FIG. 1) to an extending portion of the first handle 118, the linkage 120 terminating at a second lower end 124 (again illustrated as aligning apertures in FIG. 1) at a second and spline supported handle 126 mounted to a bottom location (see spline 128) of the support plate 12. The spline 128 is further supported in place by bottom most defined aperture 130 and associated collar 132 (see FIG. 1), and such that the second handle 126, by virtue of the linkage 120 connection to the first handle 118, can be separately (manually) actuated by user to trigger the release mechanism.

A cable support bracket is shown at 134 and is secured to the support plate 12. The cable bracket 134 supports a fixed outer sleeve 136 which surrounds and is associated with a linearly displaceable cable 138. An upper extending end of the displaceable inner cable 138 secures to a pivoting location 140 associated with the first handle 118, whereas an opposite end extends to a floor latch mechanism (representatively illustrated at 142) associated with the vehicle seat and, as previously disclosed, may be selectively engageable with a floor striker.

As is again best shown in FIG. 1, a third spring 144 secures to the support plate 12 (see at location 146 in FIG. 2 receiving first extending end 148) and includes an opposite extending end 150 (FIGS. 1 and 3) which biases the release lever 76 in an engaging direction against the pawl 34.

In operation, the release cam 56 maintains the pawl 34 in locking engagement with the teethed underside of the seatback sector 20 in the first upright position (FIGS. 2-5). The release cam 56 is rotated (see arrow 152 in FIG. 5) to cause the pawl 34 to pivot (arrow 153 in FIG. 5) out of engagement with the seatback sector 20 (and as shown in FIG. 6 by the disengagement of the respective pluralities of teeth 30 and 44), thus allowing the seatback 20 to pivot to a forward rotated position (FIG. 6), and again due to the biasing force exerted by the main clock spring 96.

Figure 6:
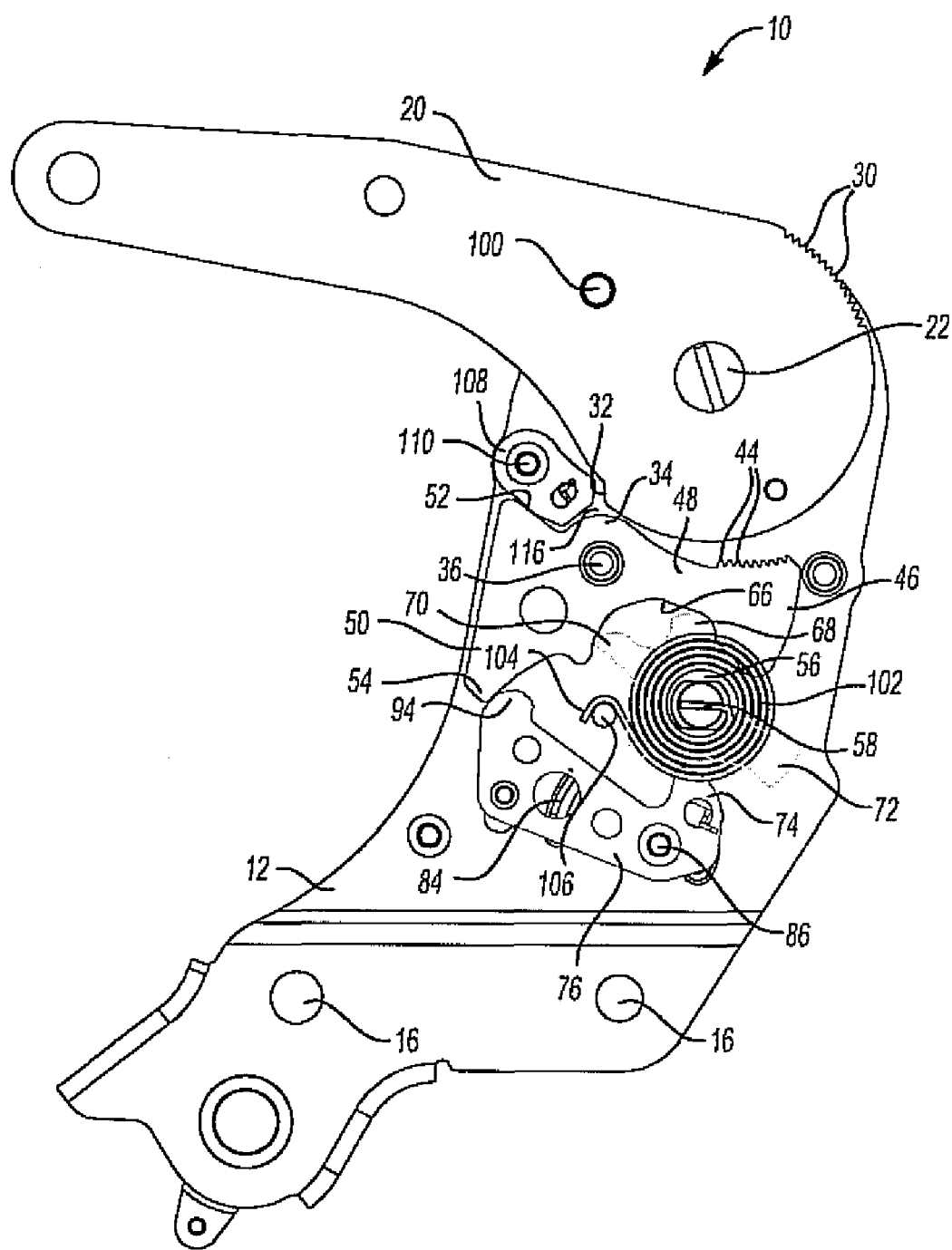
FIG. 6 is a succeeding plan view to that shown in FIG. 5, and with the cam and pawl being sequentially actuated, in order to disengage the teethed pawl from the seatback sector, allowing the seatback to be rotated to the forward dump position and maintained thereat, by virtue of the locking detent cam engaging the dump rotated seatback, in cooperation with the floor latch release lever being pivoted by its actuating cam to reposition, along with the cam into an abutting and preventative rotating contact with the pawl while in its opened position.

Location 74 of the floor latch release lever 76 is contacted by the rotating release cam 56, the release lever 76 in turn pivoting (see directional arrow 154 in FIG. 5) so that end feature 94 of the release lever 76 displaces to the position shown in FIG. 6, and which is inside of the corresponding end projecting surface 54, thereby establishing an abutting contact and preventing the locking pawl 34 from pivoting in a reverse direction against the seatback sector 20. The release lever 76 can further be reverse pivoted (such as by reverse rotation of the release cam 56 and by which projection 78 (see FIG. 1) may contact an further surface of the release lever end feature 74, thus pivoting the release lever 76 back to the position shown in FIG. 5. This occurs concurrent with the release cam 56 rotating its engaging portions 68 and 70 in a reverse direction to that indicated by arrow 152, and in order to reestablish a pawl 34 displacing and engaging relationship against the seatback sector as shown in FIG. 5, such in response to the seatback 20 first being physically rotated (against the force of main clock spring 96) back to the upright position of FIG. 5 and which is further the result of upper pawl surface 52 rotating away from an abutting underside of the detent cam 108, allowing the latter to unseat from the stepped location 32 of the seatback sector 20.

Figure 7:
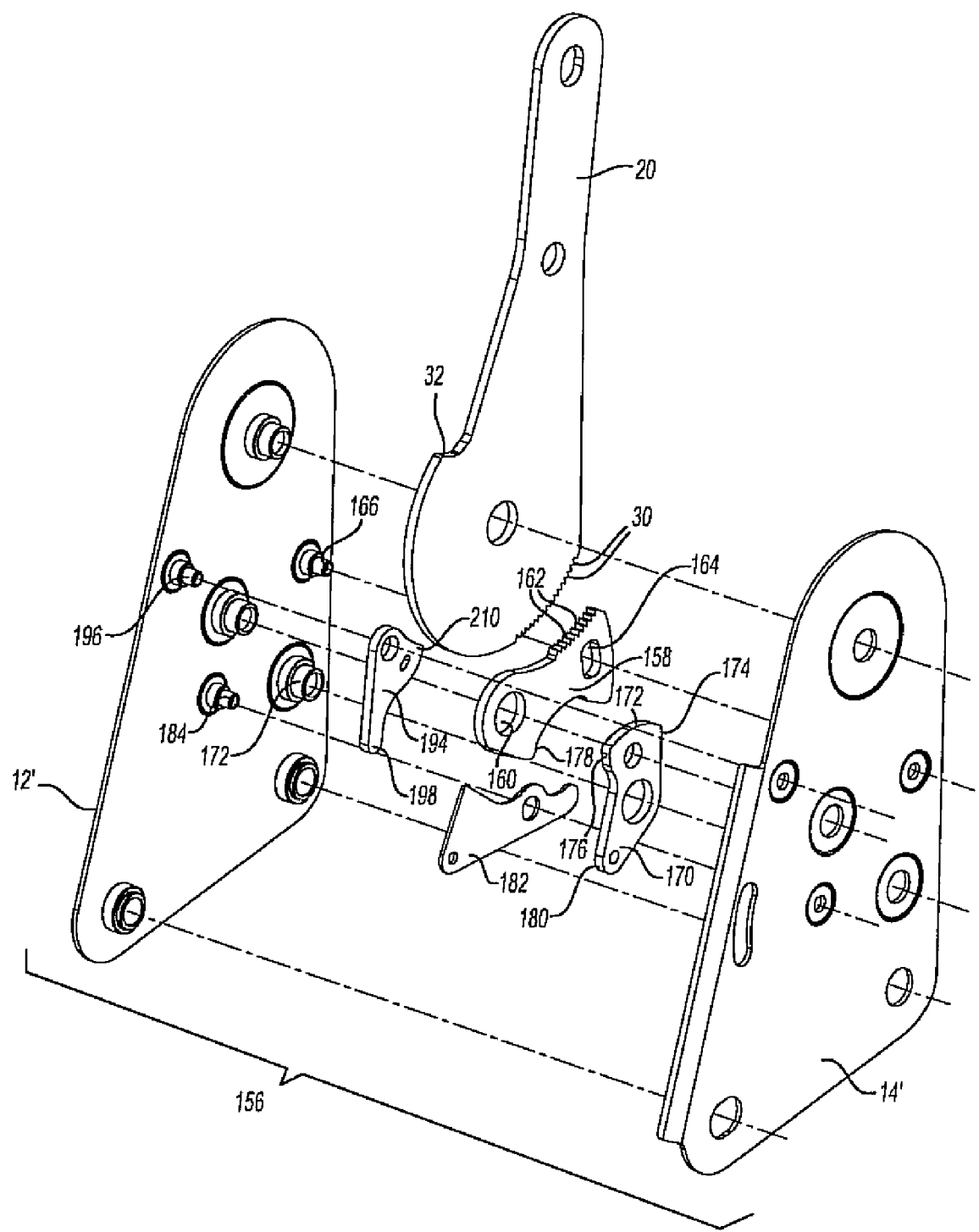
FIG. 7 is an exploded view of the seat recliner mechanism according to another embodiment of the present inventions.
Figure 8:
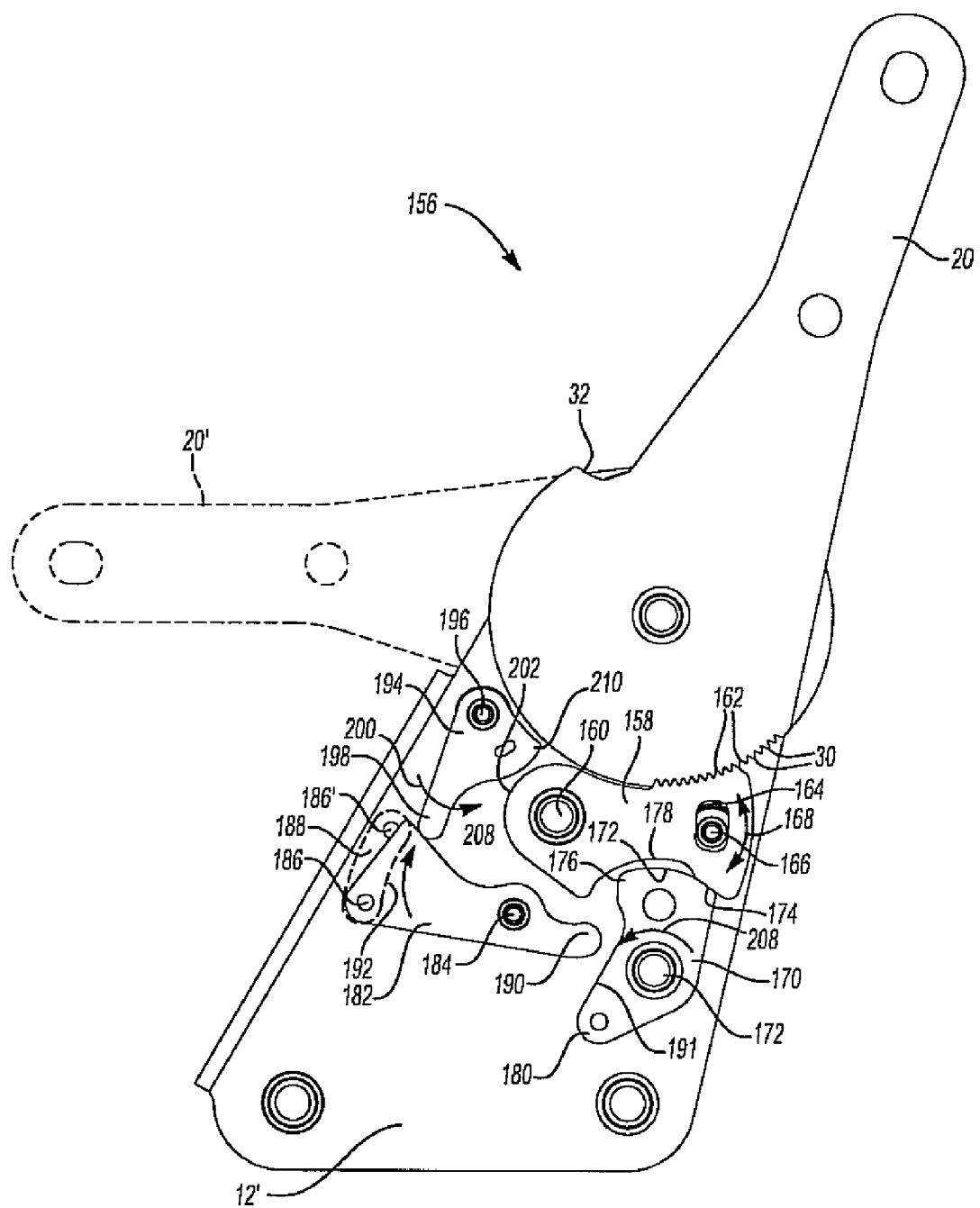
FIG. 8 is an assembled plan view of the mechanism shown in FIG. 7 and illustrating the seatback sector engaged in an upright design position.
Figure 9:
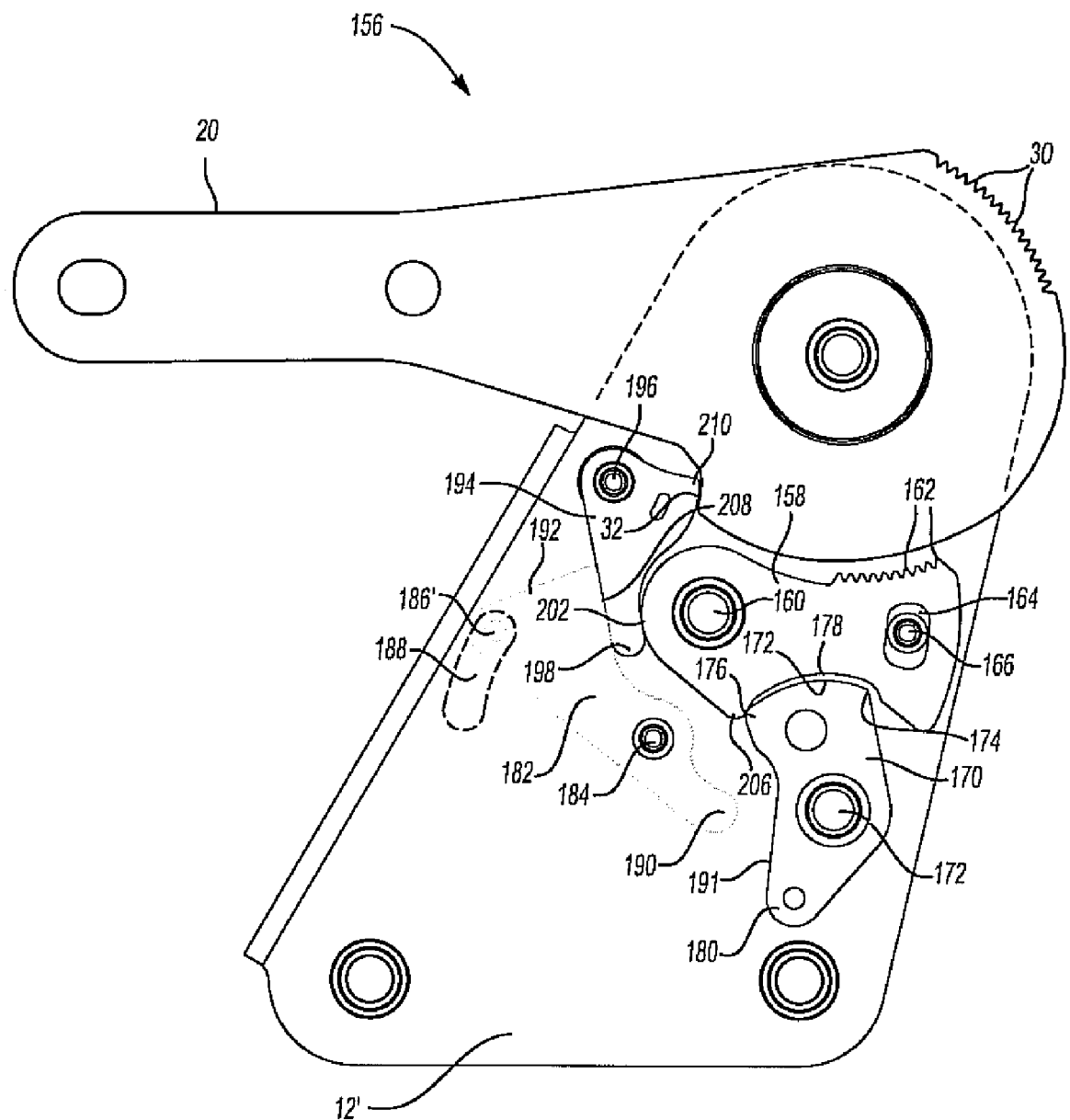
FIG. 9 illustrates a succeeding dump position of the seatback sector, resulting from the actuation of cam, pawl, and floor latch release lever and functionally similar in operation to that disclosed in FIG. 6, and by which the detent cam locks the seatback arm in the forward dump position, the floor latch release lever cooperating with the release came to prevent the teethed locking pawl from rotating into contact with the seatback.

Referring now to the exploded view of FIG. 7 and the succeeding first and second plan views of FIGS. 8 and 9, a seat recliner mechanism is generally referenced at 156 according to another embodiment. For purposes of ease of description, discussion of the variant of FIGS. 7-9 will be limited to differences in the configuration and actuation of the release cam, pawl, floor latch release lever, and detent cam, it further being understood that the additional features described in the embodiment of FIGS. 1-6 are likewise applicable to the secondary variant 156. For this reason, many features such as the first, second, and third springs, first and second handles, and interconnecting linkage, have not been repetitively illustrated but are understood to be likewise applicable to this embodiment.

Seatback sector 20 is provided as substantially previously illustrated in FIGS. 1-6 and again includes a lower arcuate surface with teeth 30, as well as a stepped location 32 formed at the boundary between the arcuate surface and the upwardly extending arm. Pawl 158 includes a first pivotally mounted location 160 and an extending body including an upwardly defined surface with a second plurality of teeth 162. The pawl 158 further includes a slot 164 extending along an interior location spaced from the second plurality of teeth, a pin 166 extending from associated support 12' (this opposing support 14') and seating within the slot 164 to define a pivotal range of motion of the pawl 158 (see also arrow 168 in FIG. 8).

A release cam 170 is also provided and is mounted for rotation about a pin 172. As with the pawl 158, the release cam 170 differs from that previously disclosed in the first embodiment and includes an upper arcuate surface 172 with first 174 and second 176 opposite edges, these coacting with a recessed underside 178 defined in the pawl 158. The release cam 170 further exhibits a lower and angularly projecting edge 180.

A release lever 182 is pivotally connected, at 184, between the plates 12' and 14'. A pin 186 extends from a location of the release lever 182 offset from its pivotal connection and seats within a first arcuate slot 188, defined in the support, and in order to define a pivotal range (see pin locations 186 and 186' in FIGS. 8 and 9) of motion of the release lever 182. The release lever 182, as further best shown in FIGS. 8 and 9, also includes a first end projecting feature 190 located proximate an inner surface 191 of the release cam extending to its angularly projecting edge 180. A second end projecting feature 192 of the release cam exhibits a generally enlarged, somewhat triangular shape, from a lower corner location of which the pin 186 extends through the slot 188.

A detent cam 194 is pivotally secured at 196 to a forward location of the support plates 12' and 14' and, as shown, proximate to each of the seatback sector 20, pawl 158 and release lever 182. The detent cam 194 includes an elongated projection 198 extending from its pivotal mounting location and, which, upon being contacted by pivoting of the polygonal/triangular end feature 192 of the release lever 182, is influenced by the upper surface of the feature 192 to in turn pivot (see directional arrow 200 in FIG. 8) into abutment with an opposing end surface 202 of the pawl 158 (see FIG. 9).

At this point, the pawl 158 (and its associated teeth 162) are rotated out of engagement with the sector 20 (and its engaging teeth 30) as a response to the rotation of the release cam 170 in the direction referenced by arrow 204 in FIG. 8 and by which the cam edge location 176 contacts feature 206 on the pawl (FIG. 9) causing the pawl to disengage from the seatback sector 20. Rotation of the release cam 170 causes its feature 176 to contact feature 190 on the release lever 182 during the initial disengagement inducing motion of the pawl 158. Additionally, an inner facing surface 208 associated with the release lever triangular feature 192 biases against a rear surface of the detent cam 194 (see again FIG. 9), the detent cam 194 operating in combination with the engagement of location 176 of the release cam 170 abutting the pawl feature 206 in order to restrain the pawl 158 in its opened position as shown in FIG. 9. As is again shown in FIG. 9, the detent cam 194 includes a shoulder 210 engageable with a stepped location formed upon the forwardly dumped seatback sector, and which prevents reverse rotation of the seatback to the upright position until such time as the release cam 182 is caused to be rotated out of engagement (from position in FIG. 9 back to that shown in FIG. 8) with the detent cam 198 according to a reverse operational protocol.

Having described our invention, other and additional preferred embodiments will become apparent to those skilled in the art to which it pertains, and without deviating from the scope of the appended claims:

We claim:

1. A recliner mechanism for use with a vehicle seat having a floor striker engaging bottom and a pivotally associated seatback, said mechanism comprising:
   a fixed and substantially planar upwardly extending support;
   a seatback affixed sector pivotally secured to an uppermost location of said support, said seatback sector exhibiting an arcuate lower surface upon which are defined a first plurality of teeth;
   a pawl pivotally secured to said support and including an upper surface upon which are formed a second plurality of teeth inter-engaging said first plurality of teeth when the seatback is in an upright position;
   a release cam secured to said support proximate a recessed underside location of said pawl, said release cam maintaining said pawl in locking engagement with said seatback sector in a first position, said release cam rotating to cause said pawl to pivot out of engagement with said seatback sector, allowing the seatback to pivot to a dump position opposing the seat bottom concurrent with the seat bottom releasing from the floor striker and tumbling to a forward rotated position;
   a floor latch release lever pivotally secured to said support and, upon being contacted by said rotating release cam, in turn pivots so that an end feature of said release lever displaces to prevent said locking pawl from pivoting in a reverse direction against said seatback sector, said release lever reverse pivoting in response to the seat bottom reengaging the floor striker, causing said pawl to reverse pivot said pluralities of teeth into reengagement, and upon the seatback rotating back to the upright position; and
   a detent cam pivotally secured to a forward location of said support proximate to each of said seatback sector, pawl and release lever, said detent cam including an elongated projection which, upon being contacted by pivoting of said end feature of said release lever, in turn pivots into abutment with a surface of said pawl when rotated out of engagement with said sector.

2. The mechanism as described in claim 1, said detent cam further comprising a shoulder engageable with a stepped location formed upon said forwardly dumped seatback sector.

3. The mechanism as described in claim 1, a pin extending from said release lever and seating within a first arcuate slot in said support to define a pivotal range of motion of said release lever.

4. The mechanism as described in claim 3, said pawl further comprising a second slot extending along an interior location spaced from said second plurality of teeth, a pin extending from said support and seating within said slot to define a pivotal range of motion of said pawl.

5. A recliner mechanism for use with a vehicle seat, comprising:
   a pair of fixed supports;
   a seatback affixed sector pivotally secured between said supports and exhibiting an arcuate lower surface upon which are defined a first plurality of teeth;
   a pawl pivotally secured between said supports and exhibiting a second plurality of teeth inter-engaging said first plurality of teeth when the seatback is in an upright position;
   said pawl further comprising an extending body secured between said supports at a pivotally mounted location, said pawl including an upwardly defined surface upon which are defined said second plurality of teeth, said pawl further including a slot extending along an interior location of said pawl, a pin extending between said supports and seating within said slot to define a pivotal range of motion of said pawl;
   a release cam secured between said supports proximate a recessed underside location of said pawl, said release cam maintaining said pawl in locking engagement with said seatback sector in a first upright position, said release cam rotating to cause said pawl to pivot out of engagement with said seatback sector, allowing the seatback to pivot to a forward rotated position;
   said release cam further comprising an upper arcuate surface with first and second opposite edges coacting within said recessed underside defined in said pawl, said release cam further including a lower and angularly projecting edge;
   a floor latch release lever pivotally secured between said supports and, upon being contacted by said rotating release cam, in turn pivoting so that an end feature of said release lever displaces to prevent said locking pawl from pivoting in a reverse direction against said seatback sector, said release lever reverse pivoting in response to the seatback rotating back to the upright position;
   a pin extends from a location of said release lever offset from its pivotal connection, said pin seating within a further arcuate slot defined in a selected support, and in order to define a pivotal range of motion of said release lever; and
   said release lever additionally comprising a first end projecting feature, located proximate an inner surface of said release cam extending to its angularly projecting edge, a second end projecting feature associated with said release cam exhibiting a generally enlarged triangular shape, and from a lower corner location of which said pin extends through said further arcuate slot.

6. The mechanism as described in claim 5, further comprising a detent cam pivotally secured to a forward location between said supports, and proximate to each of said seatback sector, pawl and release lever, said detent cam including an elongated projection extending from its pivotal mounting location and which, upon being contacted by pivoting of said triangular end feature of said release lever, is influenced by an upper surface of said triangular feature to in turn pivot into abutment with an opposing end surface of said pawl.

7. The mechanism as described in claim 6, said detent cam further comprising a shoulder engageable with a stepped location formed upon the forward rotated seatback, prevents reverse rotation of the seatback to the upright position until such time as said upper arcuate surface of said release cam is caused to be reverse rotated relative to said pawl underside.

* * * * *